United States Patent [19]

Delaunay et al.

[11] 4,266,832

[45] May 12, 1981

[54] VEHICLE WHEEL ANTI-SLIP DEVICE

[75] Inventors: Antoine Delaunay, Flers; Guy Ecolasse, Saint-Lo, both of France

[73] Assignee: Michel Boyer, Cambremer, France

[21] Appl. No.: 19,121

[22] Filed: Mar. 9, 1979

[30] Foreign Application Priority Data

Mar. 6, 1978 [FR] France ................................ 78 06596

[51] Int. Cl.³ ........................ B60B 15/06; B60B 15/10
[52] U.S. Cl. ................................................. 301/48
[58] Field of Search ................................ 301/48–49, 301/51; 172/546, 544, 541

[56] References Cited

U.S. PATENT DOCUMENTS

| | | | |
|---|---|---|---|
| 1,908,692 | 5/1933 | Connell | 301/51 X |
| 2,094,425 | 9/1937 | Cook | 301/49 |

FOREIGN PATENT DOCUMENTS

| | | | |
|---|---|---|---|
| 712595 | 10/1931 | France | 301/48 |
| 754915 | 11/1933 | France | 301/48 |

Primary Examiner—Charles A. Marmor
Attorney, Agent, or Firm—Fleit & Jacobson

[57] ABSTRACT

An anti-slip device is operated automatically by a driver from his cab by a hydraulic or manual system. Detachable blades each pivotable around a shaft are disposed on each drive wheel. In order to use the blades they must emerge and project from the peripheral part of the wheel, thus penetrating into the ground. The blades are successively actuated by a roller which rests against a control portion of the blade. The roller is mounted on a lever arm which is moved by a hydraulic jack or by a manual lever system. The blades penetrate the ground and thus prevent the wheel from slipping. In the operating position, the active portion of the blade transmits the penetrating force to the pivot shaft and a stop, i.e. not to the control portion.

8 Claims, 3 Drawing Figures

VEHICLE WHEEL ANTI-SLIP DEVICE

This invention relates to an anti-slip device to be fitted onto the wheels of a vehicle and automatically controlled by the driver from the cab by means of an hydraulic or manual system.

It is known that tractors require a motor of greater power in order to obtain an economic result on slippery or wet ground. This increased power prevents the vehicle from becoming stuck. The object of anti-slip devices is to enable such vehicles to move without the drawback of becoming stuck and without requiring excessive engine power.

The present invention provides an anti-slip device designed to be fitted to the wheels of a vehicle, which may be remote controlled by the driver and is of the type comprising blades designed to emerge from and project past the peripheral portion of the wheel, thus penetrating into the ground, the said blades each rotating around a shaft located on the lateral portion of the wheels. These blades have a lever arm on the opposite portion, on which a support element is applied, thus carrying out control. Stop-blocks are arranged in such a way that they alone bear the effort of penetration into the ground of the blades, the support element having carried out movement of the blade against the said stop before the blade penetrates the ground. This mechanism thus enables a low power drive to be used.

In a preferred embodiment, detachable blades each rotating around a shaft are located on the lateral portion of the driving wheels. For these blades to be of use, it is necessary that they project past the peripheral portion of the wheel and thus penetrate the ground.

These pivotable blades are controlled by a roller which acts on the said opposite portion of the blade. This roller is mounted on a lever arm which is driven by a hydraulic jack or by a manual assembly (of the handbrake type). When the roller is displaced under the effect of the jack or the manual assembly the roller presses on the end of the blade and positions it against a stop. The blade then penetrates the ground and prevents in this way the wheel from skidding, slipping, and sticking.

The blades are returned to the rest position by means of springs, and each comprises a counterweight on the said opposite portion, arranged in such a way that the blade is forced to return to its initial position by the centrifugal force due to the rotation of the wheel. The spring provides an initial support until the counterweight crosses the plane containing the pivot axis of the blade and the axis of the roller, which enables the blade to be fixed by the centrifugal force against a rest-block during rotation of the wheel.

The invention will be described further, by way of example only, with reference to the accompanying drawings, in which:

FIG. 1A is an enlarged partial view of a modification of the device of FIG. 1.

A jack V is fixed to an engine T of a vehicle, such as a tractor, by means of a support K. The jack V is supplied with oil pressure by means of a control (not shown) disposed close to the driver. (Instead of the jack, a system of levers may be used.)

The piston of the jack V is attached to one end of a lever arm Z by a detachable connection. The arm Z is fixed at its other end to a shaft C. The shaft C rotates in bearings Di by the engine T. Lever arms B are fixed to the respective ends of the shaft C. A fork F which receives a roller R rotatable around a shaft Aa is located at the free end of each arm B.

The assembly comprising the jack V, the lever arms Z and B, and the shaft C is pivotable around the axis of the shaft C and enables the position of the rollers R to be varied, these rollers R controlling pivotable blades P disposed on the drive wheels O of the vehicle.

Each drive wheel O may be associated with a separate control jack which may be indirectly driven. Each wheel has a hub J mounted on a driven axle Ax by means of a nut E.

A variable number of detachable blades P are located on each vehicle drive wheel O, each blade P being pivotable around a shaft At fixed on this wheel by a nut Et.

One of the ends of this blade P (the active portion) can be arranged to project past the periphery of the wheel to penetrate the ground and the other end L (the control portion) cooperates with the control roller R.

The blade P may be manufactured (as shown) in two parts, one of which slides into the other, the movable part being urged to project from the other by the pressure of a spring U, in order to prevent the blade from breaking if it encounters a hard body in the ground.

The blade urged by the control roller R comes to rest against a stop G, penetrates into the ground, and then returns to its initial position against a stop N under the effect of a spring M and a counterweight D, on which a centrifugal force acts.

By means of an automatic braking system, the control wheel may brake the blade in its operating position by means of a locking system which brakes the blade in its position (the blade remains projecting from the wheel). Preferably the stops G are adapted to hold the blades in the operating position (at least temporarily).

Figure 1:
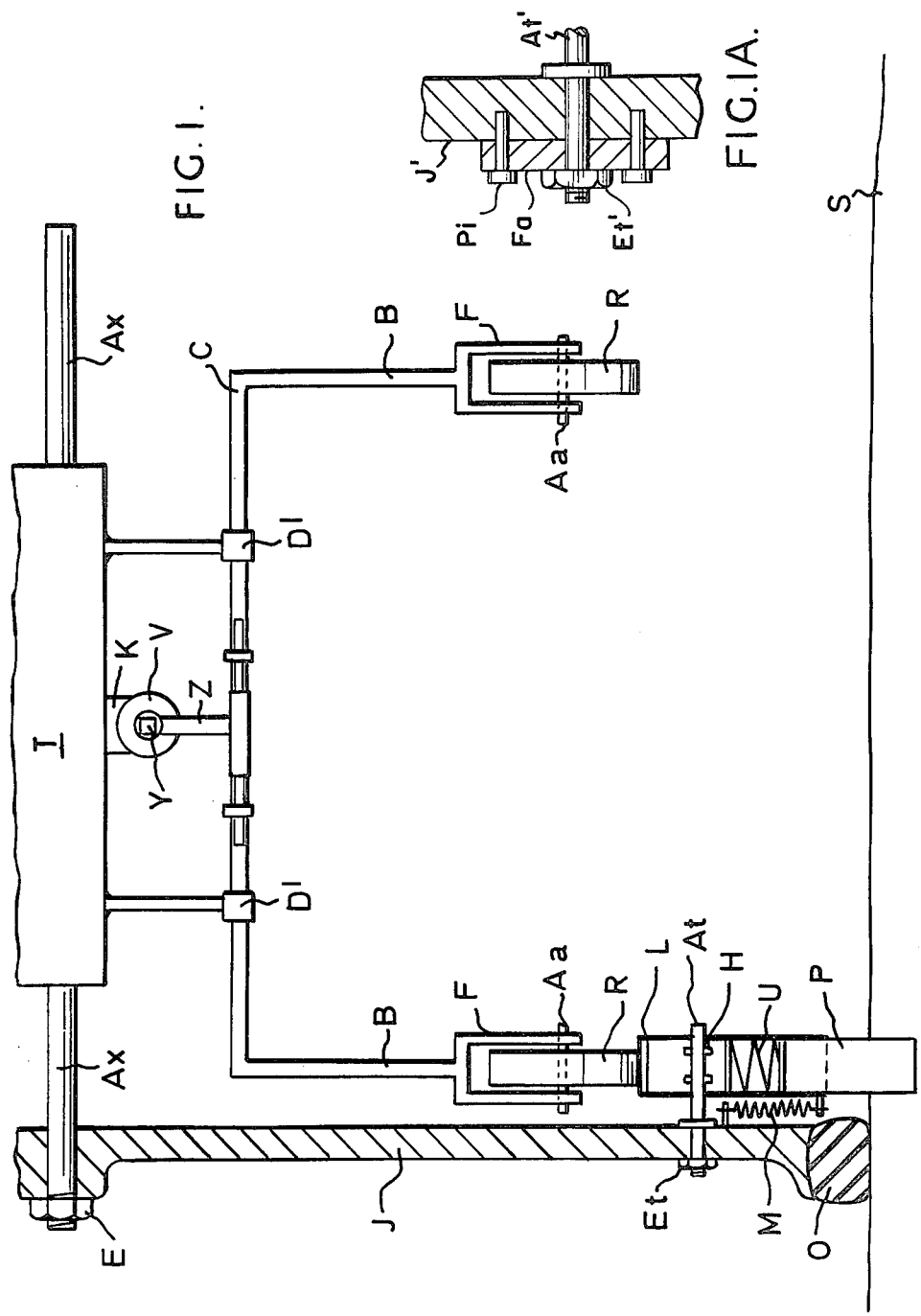
FIG. 1 is a diagrammatic view of an anti-slip device and its control system.

If the vehicle wheel is of fragile construction, the gripping device as illustrated in FIG. 1A, may be located on a flange Fa of sheet steel which is fixed by very strong pins Pi.

The blades which are of different form according to the places of work and the types of ground, are braked against the stops G before penetrating the ground and in the rest position they are located against the stops N. In order to avoid noise when the blades return to the initial position after having penetrated into the ground, hard rubber portions, one of which designated N' is illustrated, are placed on the stops.

The automatic system by means of the hydraulic jack may be replaced by a manual control, as the jack used is of a low power, given that it serves to move the blade against a stop G before the blade penetrates the ground and thus the effort is made between the blade and the stop G.

Figure 2:
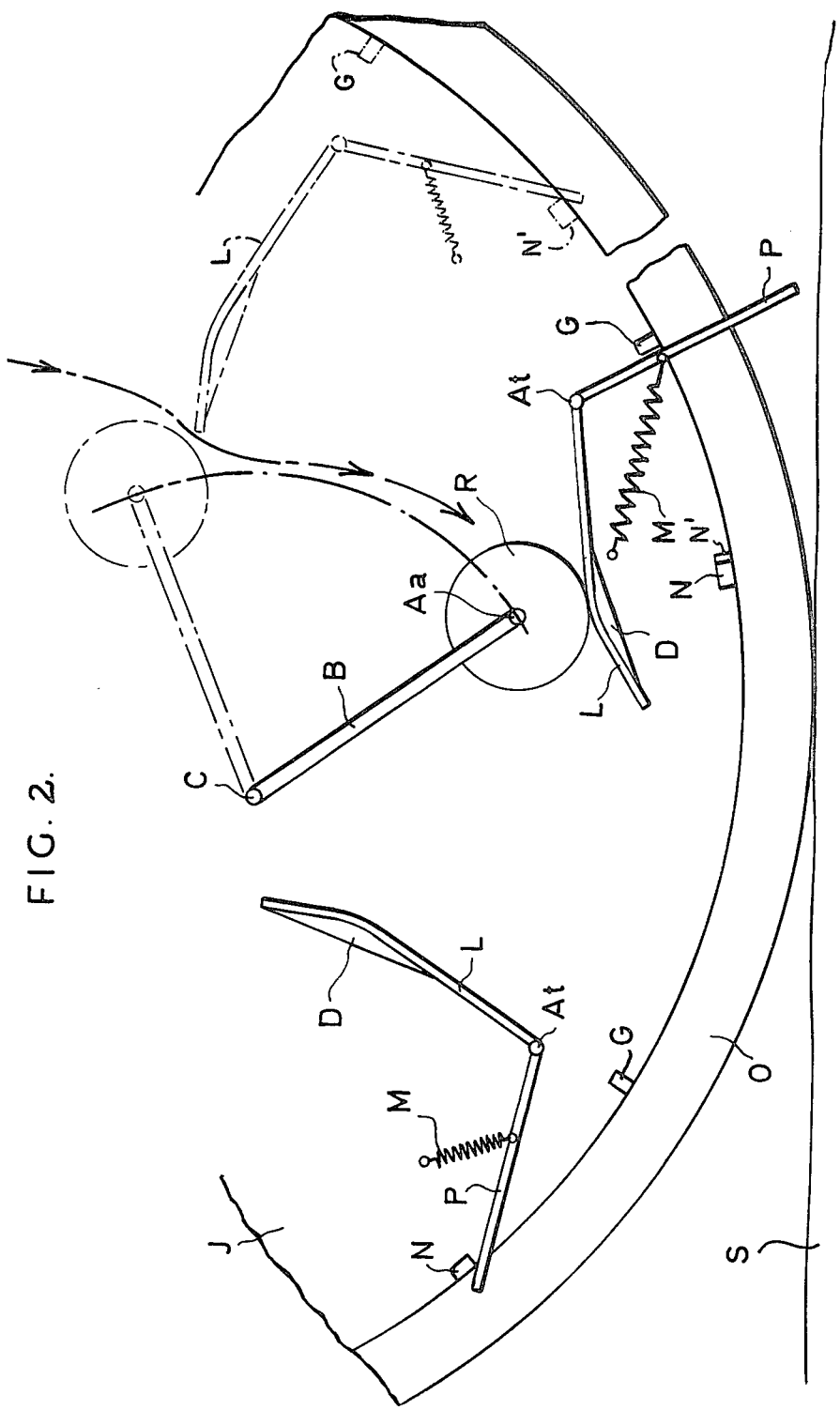
FIG. 2 is an enlarged diagrammatic view of part of the periphery of a wheel provided with the device.

In use of the vehicle, when the anti-slip device is required, the driver supplies the jack V by means of a tap, the jack V pushes the lever arm Z which controls the rollers R which then press against the successive blades located on the lateral portion of each wheel. With reference to FIG. 2, the roller R is movable between a disengaged position inwardly spaced from the end of control portion L, as illustrated in phantom, and an engaged position controlling movement of the control portion L, as illustrated in solid lines. Movement of roller R during rotation of the wheel moves the control portion L from the phantom to the solid line position.

When the driver no longer requires the anti-slip system, he closes the tap, the jack then returns to its initial position and because of this the control rollers are no longer able to press against the blades, which, by means of the springs M, are disposed in the rest position until they are again required.

In certain cases it is necessary to keep the blade braked, the blade being extended over the entire periphery of the wheel.

I claim:

1. A vehicle wheel having an anti-slip device comprising a plurality of independently pivotable blades, a plurality of pivot shafts extending laterally from the wheel and spaced around the wheel, the blades being mounted on the respective pivot shafts, each blade comprising an active portion and a successive control portion between which portions the pivot shaft lies, control means for acting on each control portion to pivot the blade from a rest position to an operating position in which the active portion of the blade projects past the periphery of the wheel before the active portion penetrates the ground during rotation of the wheel, and a plurality of stops each defining the operating position of a respective blade by cooperation with its active portion, the mutual arrangement of the pivot shaft, the active portion, and the stop associated with each blade being such that the part of the active portion which initially penetrates the ground is ahead of the pivot shaft with respect to the direction of motion of the vehicle, the reaction of the ground urging the active portion against the stop and urging the control portion away from the control means, whereby the active portion, the stop, and the pivot shaft alone transmit to the wheel the force of penetration of the active portion into the ground thereby avoiding subjecting the control means to the force of penetration.

2. A vehicle wheel having an anti-slip device as claimed in claim 1, in which the control portion of each blade comprises a counterweight positioned for returning the blade to its rest position after the active portion has risen from the ground as the wheel rotates.

3. A vehicle wheel having an anti-slip device as claimed in claim 1, in which the rest position of each blade is defined by a stop having a rubber portion to reduce noise.

4. A vehicle wheel having an anti-slip device as claimed in claim 1, in which the active portion of each blade comprises a fixed portion, a longitudinally movable portion slidably mounted in the fixed portion, and a spring urging the movable portion to project from the fixed portion.

5. A vehicle wheel having an anti-slip device as claimed in claim 1, in which the control means comprises a roller mounted on the vehicle so as to be movable to and from a position in which it bears successively against the control portions of the blades as the wheel rotates.

6. A vehicle wheel having an anti-slip device as claimed in claim 1, in which each blade is mounted on a sheet steel flange fixed to the wheel.

7. A vehicle wheel having an anti-slip device as claimed in claim 2, wherein the control portion and the active portion of each blade define between them an angle such that the blade is returned to its rest position under the effect of the counterweight during rotation of the wheel.

8. A vehicle wheel having an anti-slip device as claimed in claim 1 or 2, wherein the anti-slip device further comprises spring means for exerting a biasing force on the active portion of the blade when said blade is in the operating position, the biasing force urging the blade towards its rest position.

* * * * *

UNITED STATES PATENT AND TRADEMARK OFFICE
CERTIFICATE OF CORRECTION

PATENT NO. : 4,266,832
DATED : May 12, 1981
INVENTOR(S) : Antoine Delaunay, Flers; Guy Ecolasse, Saint-Lo, both of France It is certified that error appears in the above—identified patent and that said Letters Patent is hereby corrected as shown below:

On the title page, reference to the assignee should read as follows:

-- [73] Assignee: Michel Boyer, Cambremer, France, a part interest--.

Signed and Sealed this

Fifteenth Day of December 1981

[SEAL]

Attest:

Attesting Officer

GERALD J. MOSSINGHOFF

Commissioner of Patents and Trademarks